(12) United States Patent
Ito et al.

(10) Patent No.: US 6,712,430 B2
(45) Date of Patent: Mar. 30, 2004

(54) DRIVING UNIT

(75) Inventors: Sadao Ito, Anjo (JP); Hideki Kawabata, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 32 days.

(21) Appl. No.: 09/867,398

(22) Filed: May 31, 2001

(65) Prior Publication Data

US 2002/0011748 A1 Jan. 31, 2002

(30) Foreign Application Priority Data

May 31, 2000 (JP) ........................................ 2000-163094

(51) Int. Cl.$^7$ ................................................ B60N 2/02
(52) U.S. Cl. ........................................ 297/362; 297/367
(58) Field of Search ............................. 297/362, 354.1, 297/366, 367, 368, 369; 475/175, 162; 74/411.5, 143

(56) References Cited

U.S. PATENT DOCUMENTS

| | | | | |
|---|---|---|---|---|
| 4,090,069 A | * | 5/1978 | Lisfeld et al. | 250/201 |
| 4,382,630 A | * | 5/1983 | Weston | 297/362 |
| 4,445,961 A | * | 5/1984 | Kronseder et al. | 156/364 |
| 4,449,806 A | * | 5/1984 | Wong et al. | 354/121 |
| 4,457,557 A | * | 7/1984 | Une | 297/362 |
| 4,704,912 A | * | 11/1987 | Payne | 74/89.15 |
| 4,717,204 A | * | 1/1988 | Tezuka | 297/362 |
| 5,303,446 A | * | 4/1994 | Maresh | 15/230.11 |
| 5,350,216 A | | 9/1994 | Ito | |
| 5,516,198 A | * | 5/1996 | Yokoyama | 297/362 |
| 5,664,836 A | * | 9/1997 | Takagi | 297/367 |

FOREIGN PATENT DOCUMENTS

JP 10-014692 A 1/1998

* cited by examiner

*Primary Examiner*—Peter R. Brown
*Assistant Examiner*—Stephen Vu
(74) *Attorney, Agent, or Firm*—Burns, Doane, Swecker & Mathis, L.L.P.

(57) ABSTRACT

A driving mechanism usable in a vehicle seat reclining adjuster includes a pinion gear, a driven gear rotated by the pinion gear, and a stopper mechanism defining a rotation range of the driven gear. The stopper mechanism includes a transmitting member transmitting a stopping force to the axle portion of the pinion gear.

21 Claims, 9 Drawing Sheets

DRIVING UNIT

This application is based on and claims priority under 35 U.S.C. §119 with respect to Japanese Application No. 2000-163094 filed on May 31, 2000, the entire content of which is incorporated herein by reference.

FIELD OF THE INVENTION

This invention generally relates to a driving unit having a pinion gear and a driven gear. More particularly, the present invention pertains to a vehicle seat reclining adjuster that includes a driving unit having a stopper mechanism for defining the rotation range of the driven gear.

BACKGROUND OF THE INVENTION

A known driving unit for transmitting driving rotation from a pinion gear to a driven gear is disclosed in a Japanese Patent Application published as Toku-Kai-Hei 10 (1998)-014692. This known driving unit includes a pinion gear having a smaller number of teeth than the driven gear. A stopper mechanism for this driving unit has a stopper gear disposed beside the driven gear. The stopper gear has a slightly different number of teeth as compared to the driven gear. Both the driven gear and the stopper gear mesh with the pinion gear. Due to the difference in the number of teeth between the driven gear and the stopper gear, the driven gear and the stopper gears rotate relative to each other according to their rotation to the pinion gear. A stopper projection is formed on the side face of one of the driven gear or the stopper gear and an elongated hole is formed on the side face of the other gear to engage with the elongated hole so as to define the rotation range of the driven gear.

In the stopper mechanism used in this known driving unit, when the driven gear reaches the end of its rotation range, the pinion gear teeth get increased resistance force for meshing with the driven and the stopper gear teeth because the width between the teeth of the driven gear and the stopper gear becomes narrower. Therefore, the gears receive excessive stress when the pinion tooth is forced or thrust in the narrower teeth width.

The gear for the driving unit is formed from plastic material for producing quiet operation and a lightweight construction. However, it is difficult to make the size of the gear smaller while reducing the cost because the teeth suffer from the excessive stress when the rotation range stopper operates.

A need thus exists for a driving unit possessing a stopper mechanism which does not apply excessive stress on the gear teeth.

SUMMARY OF THE INVENTION

According to one aspect of the invention, a vehicle seat includes a seat cushion, a seat back, a lower arm secured to the seat cushion and mounted on a shaft, and an upper arm secured to the seat back and mounted on the shaft, with a position of the upper arm relative to the lower arm being adjustable. A driven gear is mounted on the shaft, and a pinion gear possesses an axle portion and a gear portion engaging the driven gear. A stopper mechanism defines a rotation range of the driven gear and includes a transmitting mechanism for applying a stopping force to the axle portion of the pinion gear.

In accordance with another aspect of the invention, a driving mechanism includes a pinion gear having a gear portion and an axle portion, a driven gear rotated by the pinion gear, and a stopper mechanism defining a rotation range of the driven gear. The stopper mechanism includes a transmitting mechanism for applying a stopping force to the axle portion of the pinion gear.

According to a further aspect of the invention, a driving mechanism includes a driven gear mounted on a shaft to rotate together with the shaft, a pinion gear having an axle portion and a gear portion engaging the driven gear, a first element provided on the driven gear, and a second stopper element provided on the pinion gear. The first stopper element and the second stopper element have portions that engage one another at an end of a rotational range of movement of the pinion gear and the driven gear to apply a stopping force to the axle portion of the pinion gear.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 6:
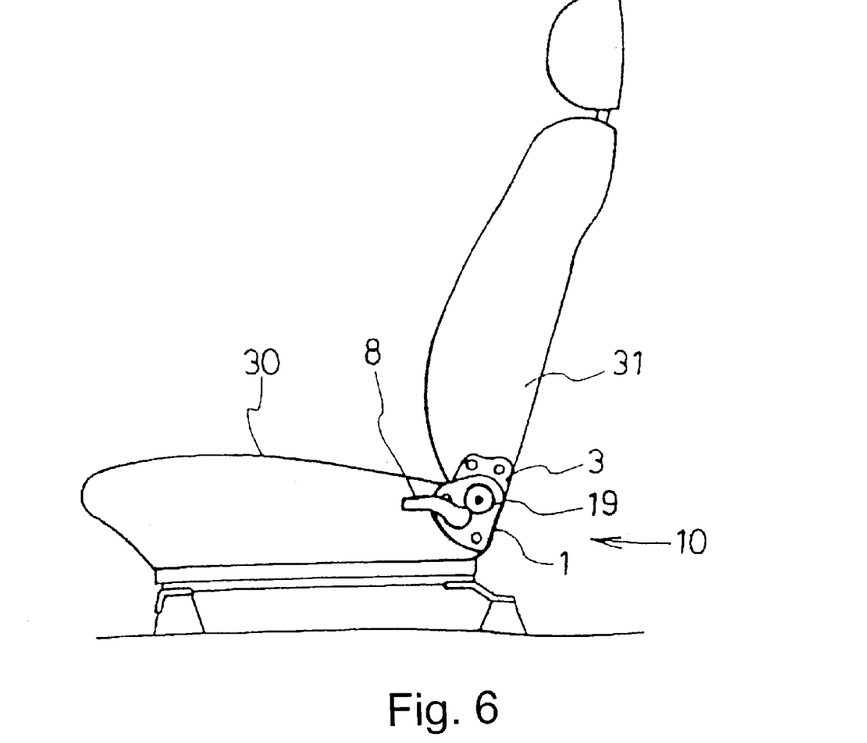
FIG. 6 is a side view of a seat unit having a reclining adjuster incorporating the driving unit provided with a stopper mechanism in accordance with the present invention.

The driving unit according to the present invention is applicable for actuating a seat reclining adjuster 10 in a vehicle seat as shown in FIG. 6. As shown in FIG. 6, the seat reclining adjuster 10 is operable to adjust the angle of the seat back 31 relative to the seat cushion 30.

Figure 1:
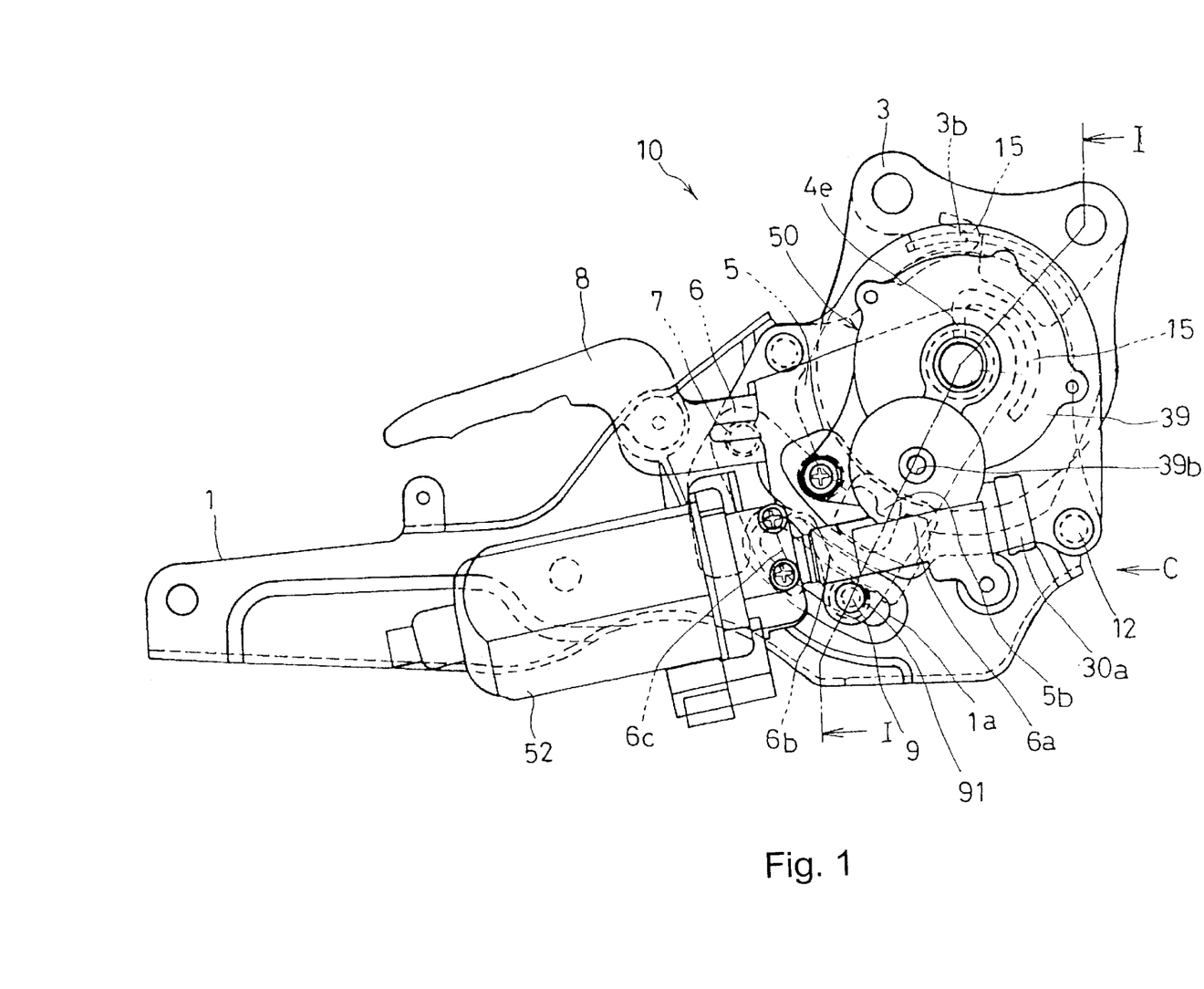
FIG. 1 is a plain view of a vehicle seat reclining adjuster incorporating a first embodiment of the driving unit having a stopper mechanism in accordance with the present invention.
Figure 2:
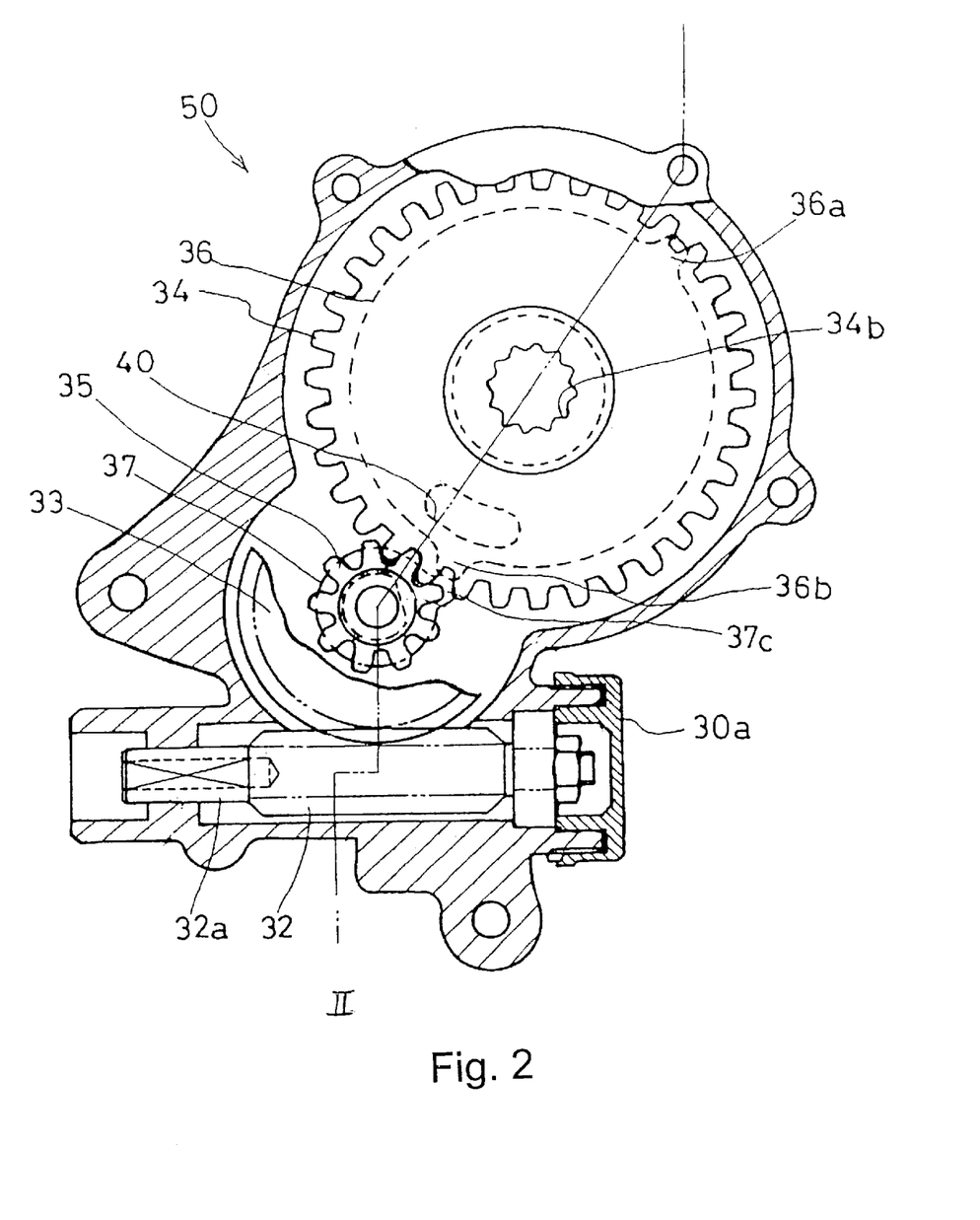
FIG. 2 is a plan view of the first embodiment of the driving unit having the stopper mechanism in accordance with the present invention.
Figure 3:
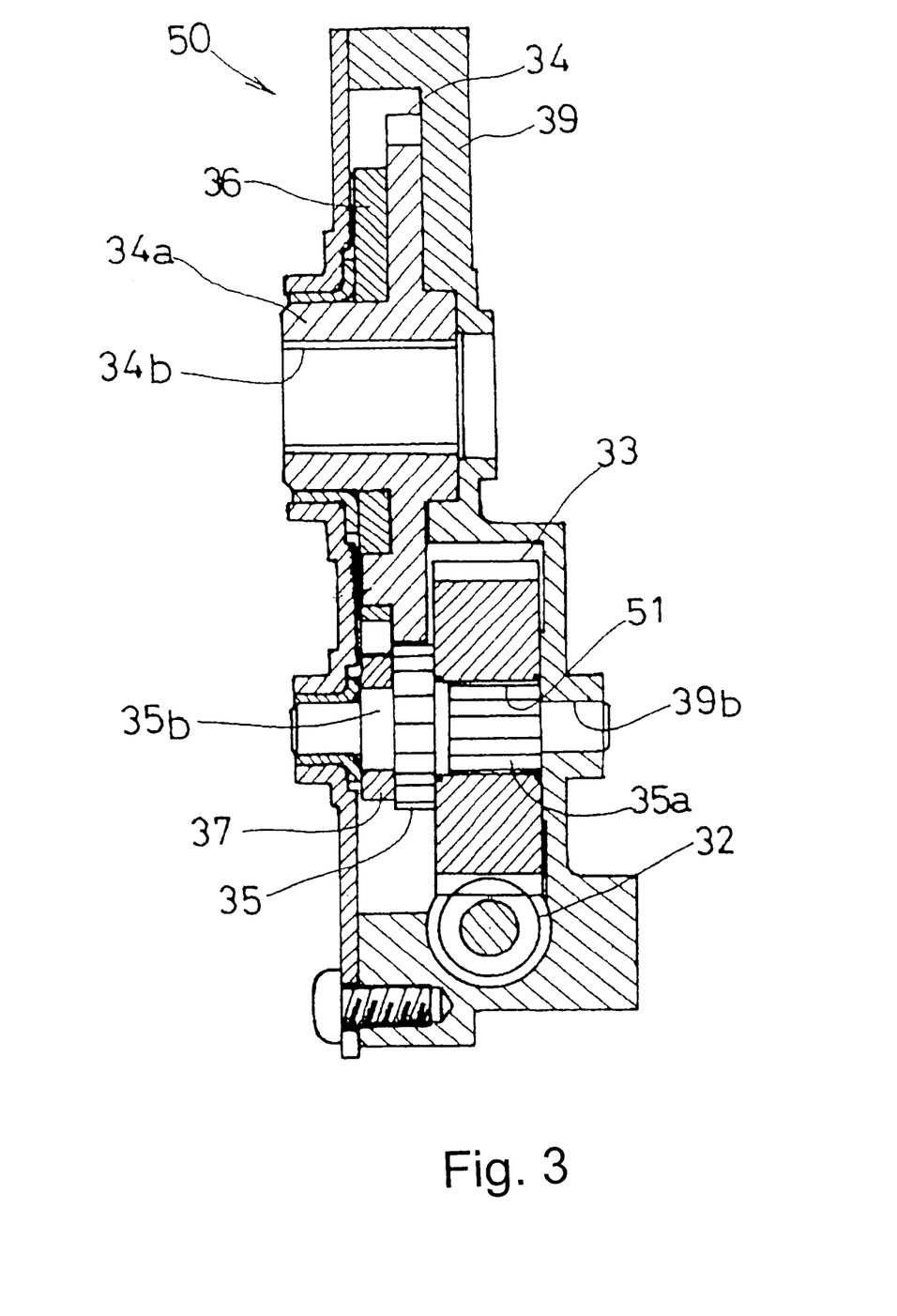
FIG. 3 is a cross-sectional view taken along the section line II—II in FIG. 2.
Figure 4:
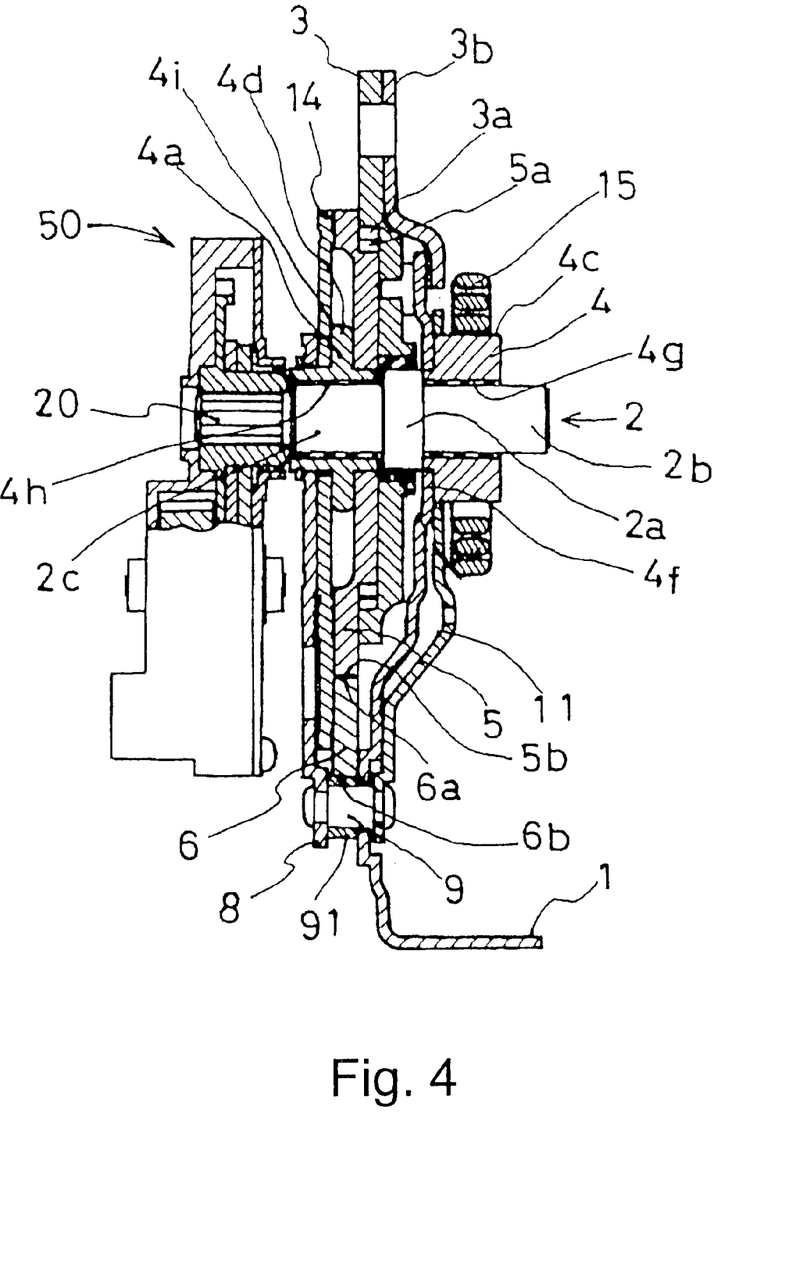
FIG. 4 is a cross-sectional view taken along the section line IV—IV in FIG. 1.

As shown in FIGS. 1 and 4, a lower arm 1 of the seat reclining adjuster 10 is fixed to the seat cushion 30, and a shaft 2 rotatably supports the lower arm 1. The shaft 2 includes an eccentric center portion 2a, right center portions 2b, 2c and a spline portion 20. An upper arm 3 is supported on the eccentric center portion 2a. The upper arm 3 is fixed with the seat back 31. A gear plate 5 is rotatably supported on the right center portion 2c via a bush 4a. Another bush 4 is supported on the other right center portion 2b, and respective slide bearings 4g, 4h with fluorocarbon resin coated treatment are arranged between the bushes 4, 4a and the right center portions 2b, 2c for permitting smooth rotation of the shaft 2.

The upper arm 3 includes an inner gear 3a formed about a center matching the center of the eccentric center portion 2a. The gear plate 5 possesses an outer gear 5a having a number of teeth that is at least one less than that of the inner gear 3a. The outer gear 5a is formed about a center that matches the center of the right center portions 2b, 2c. The outer gear 5a meshes with the inner gear 3a, and when the shaft 2 rotates the upper arm 3 rotates relative to the gear plate 5. The gear plate 5 has latch teeth 5b formed on its outer peripheral portion.

A pawl 6 is rotatably arranged on the lower arm 1 and has a latch portion 6a which is adapted to mesh with the latch teeth 5b of the gear plate 5. An operation lever 8 is rotatably arranged on the right center portion 2c of the shaft 2 via the bush 4a. A pin 9 is fixed to the operation lever 8 and a roller 91 is rotatably mounted on the pin 9. The roller 91 presses against a cam surface 6b formed on the pawl 6 to cause the latch portion 6a of the pawl 6 to mesh with the latch teeth 5b of the gear plate 5. Also when the operation lever 8 is operated by an occupant seated on the vehicle seat, the roller 91 can push an engaging portion 6c formed on the pawl 6 to release the latch portion 6a so that a locked condition between the lower arm 1 and the gear plate 5 can be released.

A spring (not shown) applies a biasing force to rotate the operation lever 8 to the direction in which the latch gear portion 6a comes into meshing engagement with the latch teeth 5b by pressing the cam surface 6b of the pawl 6 by the roller 91.

The pin 9 fixed on the operation lever 8 is movably arranged in an elongated hole 1a formed on the lower arm 1 and is also supported by a connecting plate 11 which is rotatably disposed on the outer periphery of the bush 4. A spring hook 3b is fixed on the upper arm 3.

The pawl 6, the gear plate 5, and the upper arm 3 are covered by a sub plate 14 and assembled as a unit of the seat reclining adjuster 10.

The bushes 4, 4a have through holes through which extends the shaft 2 in rotatable manner, and the bush 4 and the lower arm 1 are fixed each other at a portion 4f. The bush 4a has a flange portion 4d positioned between the gear plate 5 and the sub plate 14 so that the gear plate 5 and the sub plate 14 are supported on opposite sides of the flange portion 4d. The bush 4a and the sub plate 14 are welded and fixed each other at a fixing portion 4i.

A spiral spring 15 is arranged on the circumference 4c of the bush 4. One end of the spiral spring 15 engages an engaging groove 4e, and the other end of the spiral spring 15 engages the spring hook 3b. The spiral spring 15 applies a force causing the gear plate 5 and the upper arm 3 to rotate in the counter clockwise direction in FIG. 1.

It is to be understood that a seat reclining adjuster 10 such as described above is arranged on each side of the vehicle seat, with the reclining adjusters being connected by an operating pipe for cooperative operation of the adjusters.

Referring to FIGS. 2–5, a driving unit 50 according to the present invention includes a housing 39, a worm gear 32, a worm wheel gear 33, and a pinion gear 35. The driving unit 50 also includes a stopper mechanism 50a comprised of a driven gear 34, a stopper plate 36, and a collar 37. A worm gear shaft 32a is supported by a bearing portion of the housing 39 and a bearing 39d. The worm gear 32 is held in the housing 39 by a plug 30a and is adapted to be rotated by a motor 52.

The worm gear 32 meshes with the worm wheel gear 33, and the revolution speed of the motor 52 is reduced and transmitted to the worm wheel gear 33. The worm wheel gear 33 has a serrated hole 51 at its center, and a serrated boss portion 35a formed on the pinion gear 35 is positioned in and engaged with the serrated hole 51. The pinion gear 35 is supported by the bearing 39b fixed to the housing 39. The driven gear 34 meshes with the pinion gear 35, and has a boss portion 34a and a serrated hole 34b. The serrated hole 34b engages the serrated boss 20 (shown in FIG. 4) formed on the shaft 2. The driven gear 34 also has a projecting portion on its side wall.

Figure 5:
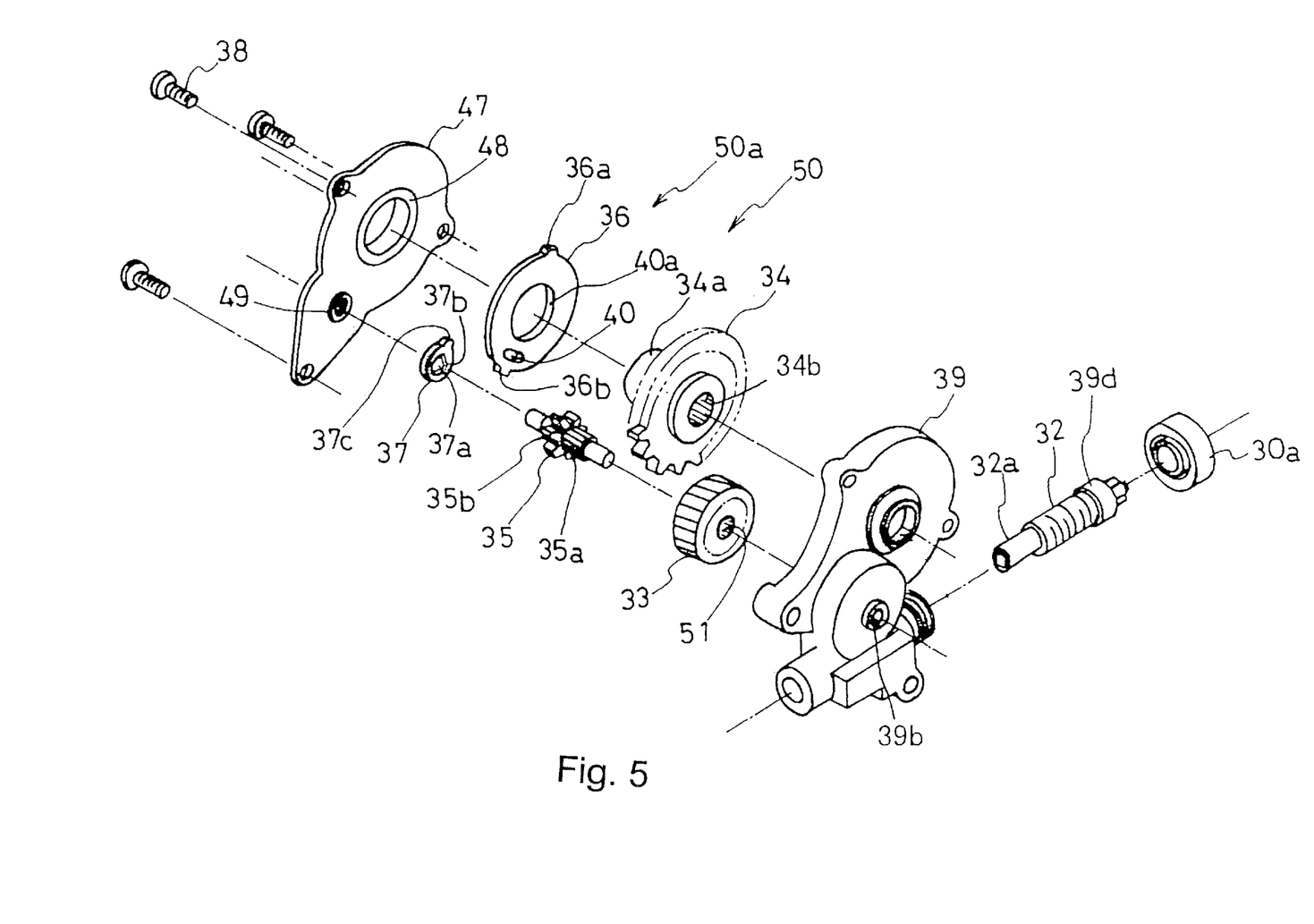
FIG. 5 is an exploded view of the first embodiment of the driving unit with a stopper mechanism according to the invention.

The stopper plate 36 is installed on the boss portion 34a of the driven gear 34 by inserting the boss portion 34a into a center hole 40a in the stopper plate 36. The stopper plate 36 has two projections 36a, 36b extending radially outwardly of the outer periphery. In addition, an elongated somewhat arc-shaped hole 40 is formed on the side surface of the stopper plate 36. The projecting portion on the side wall of the driven gear 34 fits into or engages the elongated hole 40 in the stopper plate 36 without clearance. Thus, the stopper plate 36 and the driven gear 34 rotate togther as a unit. Of course, other mechanisms can be employed for connecting the stopper plate 36 and the driven gear 34, such as through the use of fastening bolts. Also, to facilitate smooth rotational operation of the gears, lubrication grease can be supplied.

A stopper collar 37 is positioned on the portion of the axle of the pinion gear 35 opposite to the portion where the worm wheel gear 33 is positioned. The stopper collar 37 has a center hole 37a possessing a flat portion 37b formed nearer to the center of the hole. The pinion gear 35 has a larger diameter axle portion 35b than the both end portions of its axle. The axle portion 35b where the stopper collar 37 is positioned also has a flat portion that fits tightly with the flat portion 37b of the center hole 37a of the stopper collar 37. The pinion gear 35 and the stopper collar 37 thus rotate together as a unit. The stopper collar 37 also has one projection 37c projecting radially outwardly from its outer periphery. It is to be understood that the stopper collar 37 and the pinion gear 35 can also be produced as one part by being combined togther through use of a forging process.

When the pinion gear 35 and the driven gear 34 rotate so that the pinion gear 35 is at a predetermined position relative to the driven gear 34, one of the two projections 36a, 36b of the stopper plate 36 comes into contact with the projection 37c, and the rotation of the driven gear 34 relative to the pinion gear 35 is thus stopped. Within the range defined by the two projections 36a, 36b formed on the stopper plate 36, the relative rotation of the driven gear 34 and the pinion gear 35 is permitted.

A cover 47 is assembled to the housing 39 by screws 38 to hold the worm wheel 33, the pinion gear 35, the driven gear 34, the stopper plate 36, and the stopper collar 37 in the housing 39.

The operation of the seat reclining adjuster 10 that includes the above-described driving unit 50 is as follows. FIG. 1 shows the seat reclining adjuster 10 set in the usual use situation for accommodating an occupant on the vehicle seat. The gear plate 5 is locked on the lower arm 1 by the engagement of the latch teeth 6a of the pawl 6 and the latch 5b of the gear plate 5.

When the shaft 2 is rotated by the motor 52 via driving unit 50, the upper arm 3 rotates relative to the gear plate 5 with swinging motion actuated by the meshing operation between the inner gear 3a and the outer gear 5a. The reclining angle of the seat back 31 (shown in FIG. 6) that is fixed with the upper arm 3 is thus adjusted relative to the seat cushion 30 that is fixed to the lower arm 1.

When the operation lever 8 is operated against the aforementioned spring force, the engagement of the roller 91 on the cam surface 6b is released and the latch 6a of the pawl 6 is disengaged from the latch teeth 5b of the gear plate 5. The locked engagement between the gear plate 5 and the lower arm 1 is thus released. As a result of this operation, the upper arm 3 and the gear plate 5 are rotated by the force of the spring 15 relative to the lower arm 1. The frontward reclining operation for folding the seat back 31 over the seat cushion 30 is thus achieved.

The operation of the driving unit 50 with the above mentioned stopper mechanism 50a is as follows. When the motor 52 is actuated and its revolution is input to the worm gear shaft 32a, the transmitted revolution speed to the worm wheel gear 33 from the motor 52 is reduced. As the worm wheel gear 33 is disposed on the serrated boss portion 35a of the pinion gear 35, the pinion gear 35 and the worm wheel gear 33 rotate together. The revolving speed of the pinion gear 35 is further reduced by the driven gear 34, and is transmitted to the shaft 2. At the same time the stopper plate 36 rotates with the driven gear 34 because they are fixedly engaged with one another through the engagement of the projection on the driven gear 34 with the elongated hole 40 in the stopper plate 36.

Figure 7:
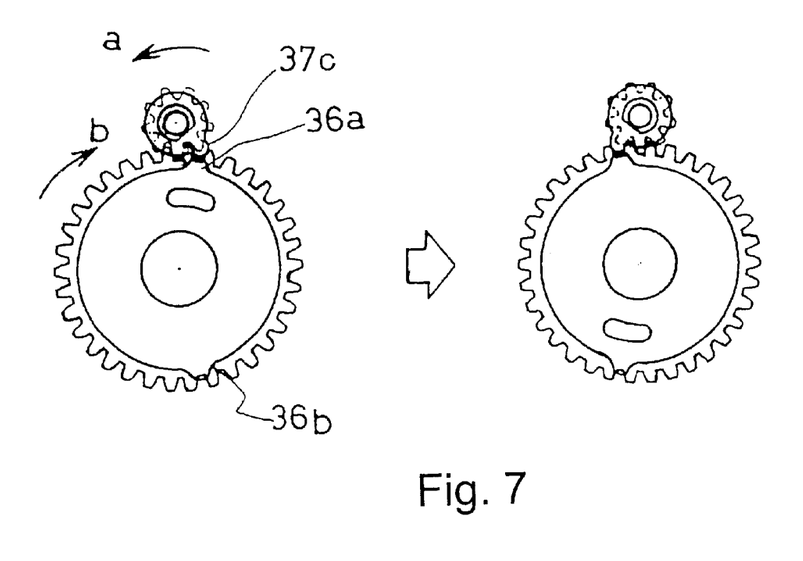
FIG. 7 is a side view of the stopper mechanism used in the first embodiment of the driving unit according to the present invention.
Figure 8:
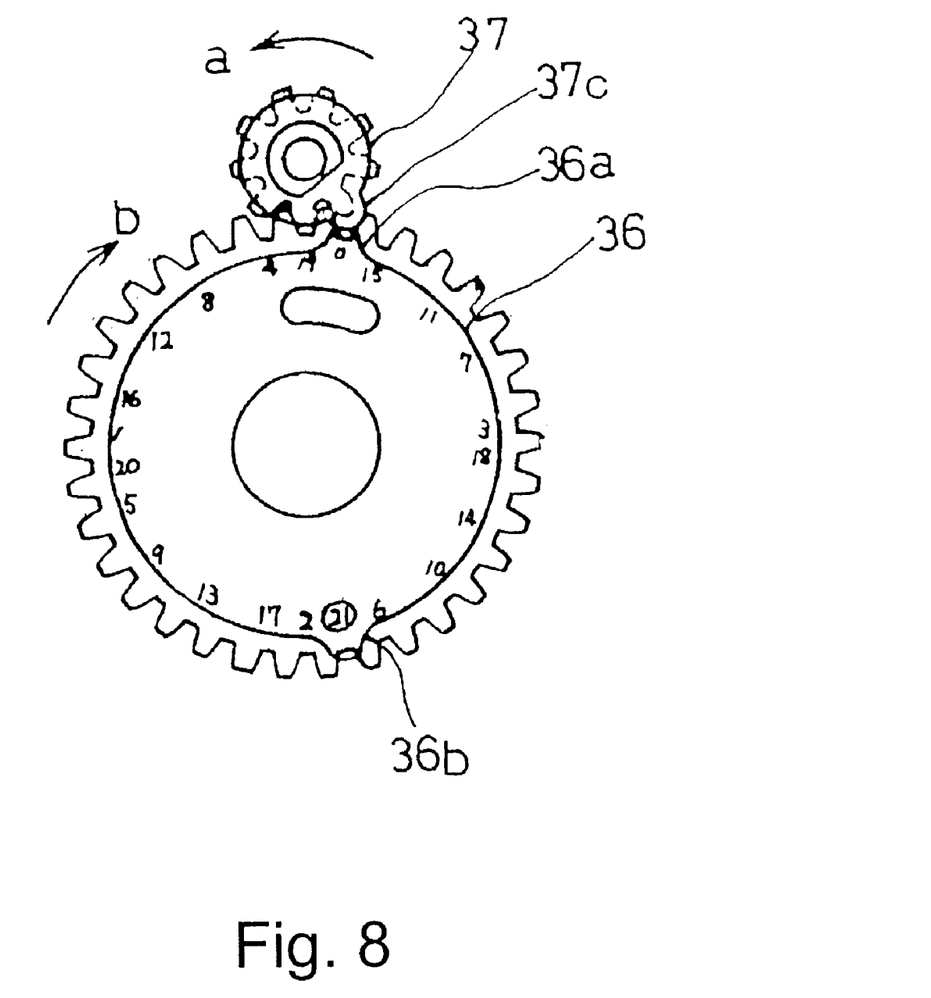
FIG. 8 is a side view of the stopper mechanism incorporated into the first embodiment of the driving unit in accordance with the present invention.

With respect to the operation of the stopper mechanism 50a, the stopper mechanism 50a shown in FIGS. 5, 7 and 8 includes the pinion gear provided with nine teeth and the driven gear 34 provided with thirty-four teeth. To simplify an understanding of this aspect of the invention, consider a simplified case in which one projection is formed on each of the stopper plate 36 and the stopper collar 37. After the two projections contact each other and stop, and the pinion gear 35 rotates inversely or oppositely relative to the driven gear 34, they then come to contact each other again. During this operation, the pinion rotates thirty-four rounds, and the driven gear 34 rotates nine rounds. This means that the designer has a choice of setting the rotation range within nine times for the driven gear 34 by appropriately setting the second projection 36b on the stopper plate 36.

FIG. 8 shows a way of setting the rotation range. The figures written on the stopper plate 36 indicate the positions of the projection 37c of the stopper collar 37 according to the number of rotations of the stopper collar 37. By way of example as shown in FIGS. 7 and 8, the second projection 36b is set at the position indicated by the figure "21". This means that after twenty-one rounds of rotation of the pinion gear 35 from the start position shown in FIG. 8, and five rounds plus 200 degrees rotation of the driven gear 34, the projections 37c and 36b come into contact with each other.

Upon operation of the stopper mechanism 50a, the stopping force does not generate the stress on the teeth of the pinion gear 35 and the driven gear 34, because the stopping force is transmitted to the axle of the pinion gear 35 by the contact of the stopper collar 37 and the stopper plate 36. Thus the driving unit 50 transmits the rotation from the motor 52 via the worm gear 32, the worm wheel gear 33, and the pinion gear 35 to the driven gear 34 with the reduction of the revolution speed, and can also define the rotation range.

Figure 9:
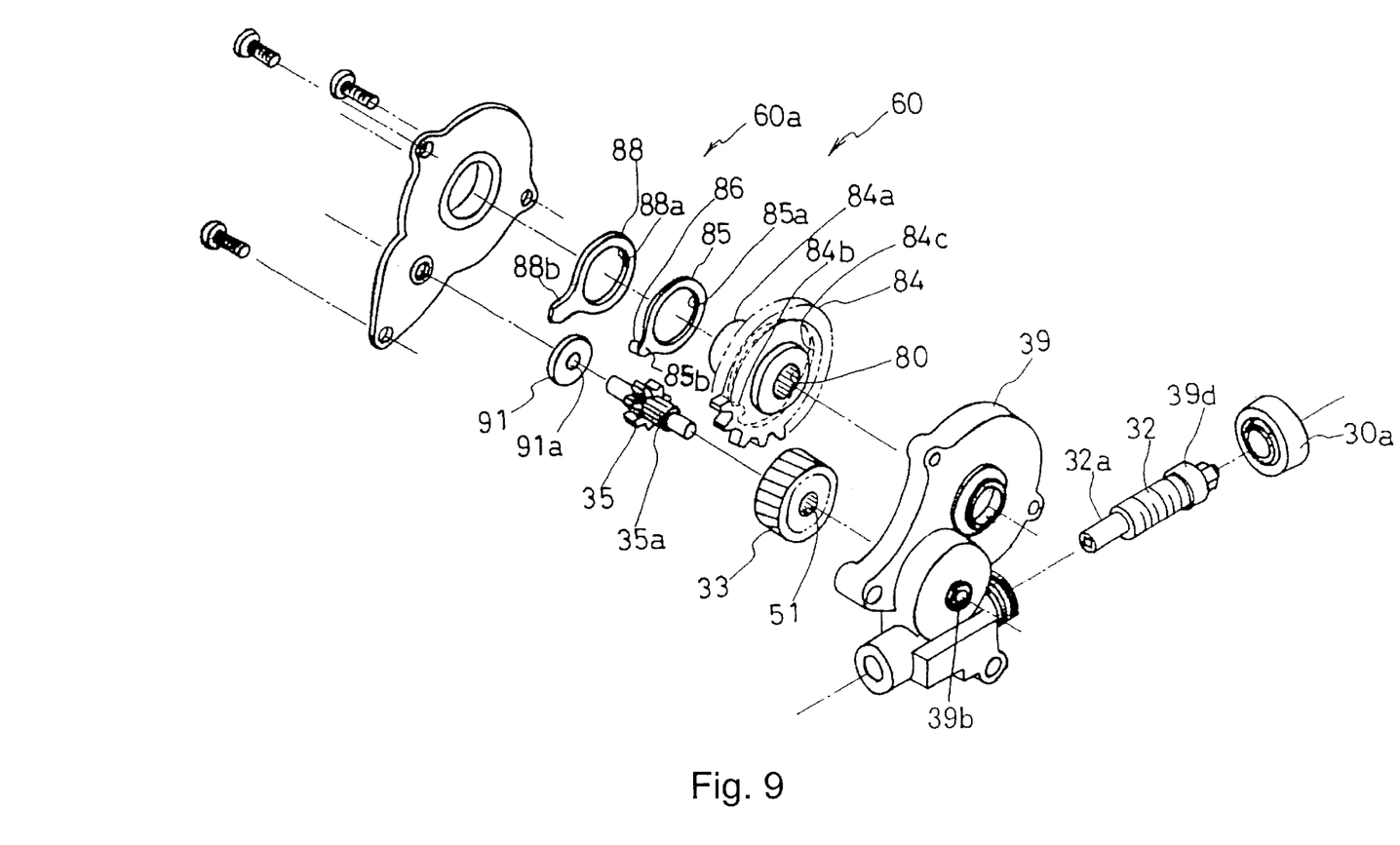
FIG. 9 is an exploded view of a second embodiment of the driving unit with a stopper mechanism in accordance with the present invention.

A second embodiment of the present invention is illustrated in FIG. 9 which shows another configuration of a driving unit 60 that includes a stopper mechanism 60a. In a manner similar to the first embodiment, the stopper mechanism 60a includes a gear 84, a worm gear 32, a worm wheel gear 33, and a pinion gear 35. The stopper mechanism 60a has a first stopper plate 85, a second stopper plate 88 and stopper washer or stopper collar 91. The first stopper plate 85 can be made from a steel plate and has a ring shape or annular shape, possessing a projection 85b on its periphery. A pin 86 is fixed on the side surface at the top portion of the projection 85b so that the pin 86 projects in the direction of the second stopper plate 88. The boss 84a of the gear 84 is positioned in a center hole 85a of the first stopper plate 85. On one side of the gear 84, a round or annular shaped dent or recess 84c is formed. The first stopper plate 85 is accommodated in the dent or recess 84c and is arranged rotatably on the boss 84a. The pin 86 extends toward the opening of the dent 84c. A projection 84b is formed on the inner periphery of the dent 84c and extends toward the center of the dent 84c. The projection 85b of the first stopper plate 85 is adapted to contact the projection 84b when the projection 85b rotates.

Further, on the side of the first stopper plate 85 opposite to the side surface where the first stopper plate 85 contacts the gear 84, the second stopper plate 88 is rotatably arranged on the boss 84a. The second stopper plate 88 has a shape similar to the first stopper plate 85, including a projection 88b on its periphery. The projection 88b is longer than the projection 85b, and the projection 88 is arranged to be able to contact the outer periphery of the annular shaped stopper washer 91.

Figure 10:
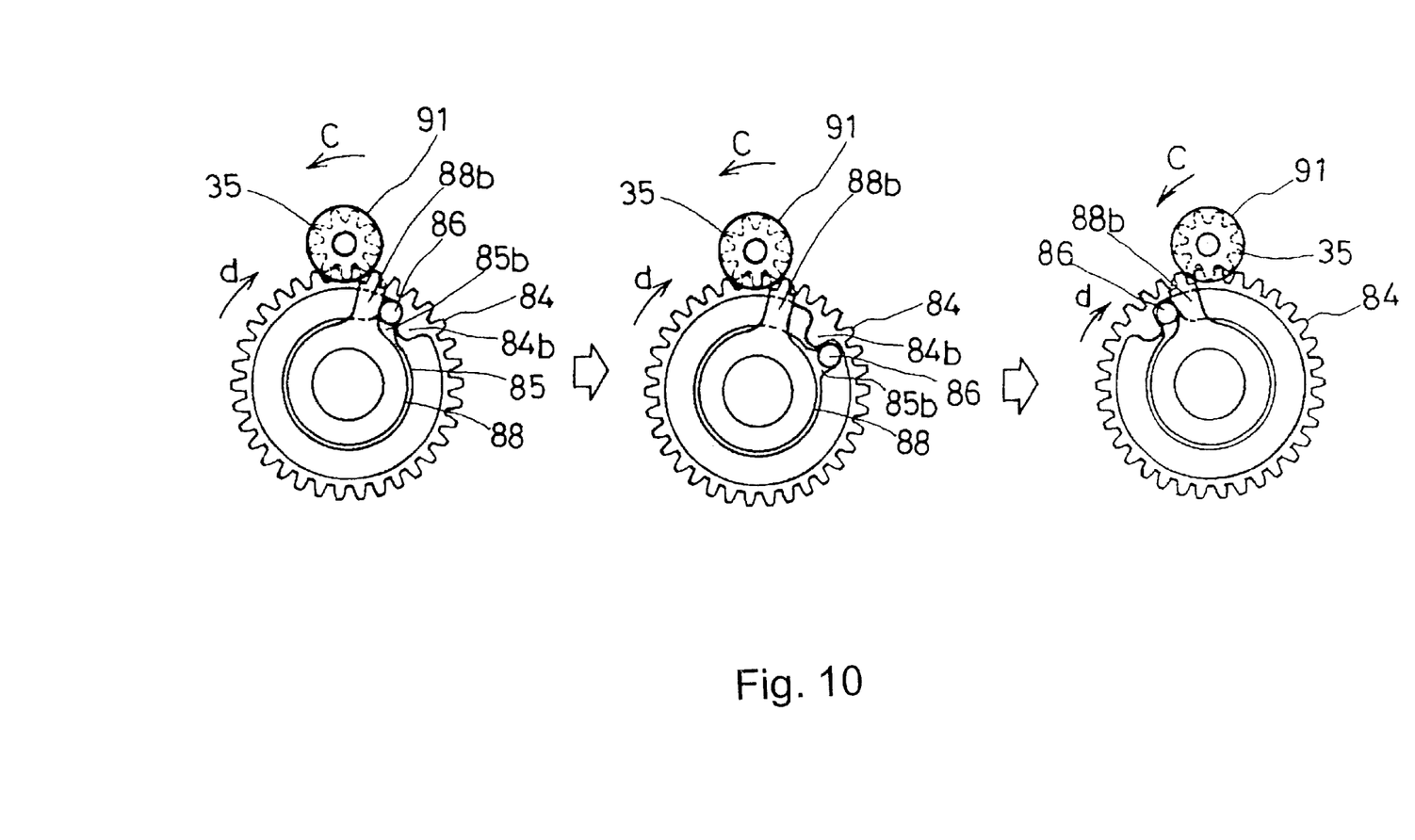
FIG. 10 is a side view of the stopper mechanism incorporated into the second embodiment of the driving unit in accordance with the present invention.

The left side drawing in FIG. 10 shows the situation where the stopper mechanism 60a stops the driving unit 50 on the one side of the rotation range. When the projection 85b of the first stopper plate 85 contacts the projection 84b of the gear 84, the pin 86 on the projection 85b contacts the projection 88b, and the projection 88b contacts the stopper washer 91, the rotation of the pinion gear 35 is stopped in the direction opposite to the direction indicated by the arrow c in FIG. 10.

On the other hand, when the pinion 35 rotates in the direction indicated by the arrow c in FIG. 10, the gear 84 rotates in the direction indicated by the arrow d. The center illustration in FIG. 10 shows the situation when the gear 84 rotates one round or revolution from the left drawing situation. Here, the projection 84b of the gear 84 contacts the opposite side of the projection 85b, and the projections 84b, 85b rotate together. When the gear 84 rotates another round or revolution, the pin 86 contacts the edge of the projection 88b opposite to the edge where the pin 86 contacts in the starting situation shown in the left drawing situation. When the gear 84 completes three rounds or revolutions of rotation, the second stopper plate 88 reaches the reaches the position shown in the right drawing situation in FIG. 10. The projection 88b comes into contact with the stopper washer 91, and further rotation of the gear in the direction indicated by the arrow d is prevented.

This second embodiment has two stopper plates, but it is to be understood that the rotation range can be widen or varied by increasing the number of stopper plates in accordance with the present invention.

When the stopper mechanism 60a operates, the stopping force is also transmitted to the axle of the pinion gear 35 through the first and second stopper plates 85, 88 and the stopper washer 91 as in the first embodiment. As a result, excessive stress on the gear 84 teeth is avoided.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat comprising:
   a seat cushion;
   a seat back;
   a lower arm secured to the seat cushion and mounted on a shaft;
   an upper arm secured to the seat back and mounted on the shaft, with a position of the upper arm relative to the lower arm being adjustable;
   a driven gear mounted on the shaft;
   a pinion gear having an axle portion and a gear portion engaging the driven gear;
   a stopper mechanism defining a rotation range of the driven gear; and
   the stopper mechanism including transmitting means for applying a stopping force to the axle portion of the pinion gear.

2. The vehicle seat as set forth in claim 1, wherein the transmitting means includes a stopper plate rotatable together with the driven gear and a stopper collar rotatable together with the pinion gear.

3. The vehicle seat as set forth in claim 2, including a first projection formed on the stopper plate and a second projection formed on the stopper collar, the first and second projections coming into contact with each other when the driven gear and the pinion gear rotate to a predetermined rotational position.

4. The vehicle seat as set forth in claim 1, wherein the transmitting means includes a first stopper plate rotating with the driven gear when the first stopper plate is engaged with the driven gear, and a second stopper plate rotating with the first stopper plate when the second stopper plate is engaged with the first stopper plate, one of the stopper plates coming into contact with the axle portion of the pinion when the driven gear reaches an end of the rotation range.

5. The vehicle seat as set forth in claim 1, wherein the transmitting means includes a stopper plate rotatable together with the driven gear and a stopper collar engaging the axle portion of the pinion gear.

6. The vehicle seat as set forth in claim 5, wherein the stopper plate is fixed with the driven gear and the stopper collar is fixed with the axle portion of the pinion gear that is positioned axially to one side of the gear portion.

7. The vehicle seat as set forth in claim 1, wherein the transmitting means applies the stopping force to the axle portion of the pinion gear other than by way of the gear portion of the pinion gear.

8. The driving mechanism as set forth in claim 1, wherein the transmitting means comprises a first projection separate from the gear teeth and rotatable together with the driven gear and a second projection separate from the gear portion and rotatable together with the pinion gear, the first and second projections engaging one another at one end of a rotational range of movement of the pinion gear and the driven gear.

9. A driving mechanism comprising;
   a pinion gear having a gear portion and an axle portion;
   a driven gear engaged with the gear portion of the pinion gear to be rotated by the pinion gear;
   a stopper mechanism defining a rotation range of the driven gear; and
   the stopper mechanism including transmitting means for applying a stopping force to the axle portion of the pinion gear.

10. The driving mechanism as set forth in claim 9, wherein the transmitting means includes a stopper plate rotatable together with the driven gear and a stopper collar rotatable together with the pinion gear, and a first projection formed on the stopper plate and a second projection formed on the stopper collar that come into contact with each other when the driven gear and the pinion gear rotate to a predetermined rotational position.

11. The driving mechanism as set forth in claim 9, wherein the transmitting means includes a first stopper plate rotating with the driven gear when the first stopper plate is engaged with the driven gear, and a second stopper plate rotating with the first stopper plate when the second stopper plate is engaged with the first stopper plate, one of the stopper plates coming into contact with the axle portion of the pinion when the driven gear reaches an end of the rotation range.

12. The driving mechanism as set forth in claim 9, wherein the transmitting means applies the stopping force to the axle portion of the pinion gear other than by way of the gear portion of the pinion gear.

13. The driving mechanism as set forth in claim 9, wherein the transmitting means includes a stopper plate fixed with the driven gear to rotate together with the driven gear and a stopper collar fixed with the pinion gear to rotate together with the pinion gear, and a first projection formed on the stopper plate and a second projection formed on the stopper collar, the first and second projections coming into contact with each other at either end of the rotation range of the driven gear.

14. The driving mechanism as set forth in claim 9, wherein the driving mechanism is mounted at a vehicle seat.

15. The driving mechanism as set forth in claim 9, wherein the transmitting means comprises a first projection separate from the gear teeth and rotatable together with the driven gear and a second projection separate from the gear portion and rotatable together with the pinion gear, the first and second projections engaging one another at one end of a rotational range of movement of the pinion gear and the driven gear.

16. A driving mechanism comprising:
   a driven gear mounted on a shaft to rotate together with the shaft;
   a pinion gear having an axle portion and a gear portion engaging the driven gear;
   a first stopper element provided on the driven gear;
   a second stopper element provided on the pinion gear;
   the first stopper element and the second stopper element each including portions that engage one another at either end of a rotational range of movement of the pinion gear and the driven gear to apply a stopping force to the axle portion of the pinion gear.

17. The driving mechanism as set forth in claim 16, wherein the first stopper element is a stopper plate mounted on a hub of the driven gear to rotate together with the driven gear and the second stopper element is a stopper collar mounted on the axle portion of the pinion gear to rotate together with the pinion gear.

18. The driving mechanism as set forth in claim 17, wherein the portion of the first stopper element is a first projection formed on the stopper plate and the portion of the second stopper element is a second projection formed on the stopper collar, the first and second projections coming into contact with each other when the driven gear and the pinion gear rotate to a predetermined rotational position.

19. The driving mechanism as set forth in claim 16, wherein the first stopper element includes a first stopper plate rotating with the driven gear when the first stopper plate is engaged with the driven gear, and including a second stopper plate rotating with the first stopper plate when the second stopper plate is engaged with the first stopper plate, one of the stopper plates coming into contact with the axle portion of the pinion when the driven gear reaches an end of the rotation range.

20. The driving mechanism as set forth in claim 16, wherein the first stopper element is fixed with the driven gear and the second stopper element is fixed with the pinion gear.

21. The driving mechanism as set forth in claim 16, wherein the driving mechanism is mounted at a vehicle seat.

* * * * *